United States Patent [19]

Groves, Jr.

[11] 3,773,110

[45] Nov. 20, 1973

[54] METHOD OF REMOVING LIQUIDS AND SMALL SOLIDS FROM WELL BORES

[75] Inventor: William L. Groves, Jr., Ponca City, Okla.

[73] Assignee: Continental Oil Company, Ponca City, Okla.

[22] Filed: Aug. 14, 1972

[21] Appl. No.: 280,293

[52] U.S. Cl..................... 166/309, 166/311, 175/69
[51] Int. Cl............................................. E21b 21/04
[58] Field of Search ................ 175/69, 71; 166/309, 166/311

[56] References Cited
UNITED STATES PATENTS

| | | | |
|---|---|---|---|
| 3,130,798 | 4/1964 | Schramm et al...................... | 175/69 |
| 3,219,115 | 11/1965 | Hower et al. .......................... | 175/69 |
| 3,391,750 | 7/1968 | Zika................................. | 166/309 X |
| 3,572,439 | 3/1971 | Hutchison et al................. | 175/69 X |

*Primary Examiner*—David H. Brown
*Attorney*—Joseph C. Kotarski et al.

[57] ABSTRACT

In the method of removing cuttings and formation fluids from the bore of a well utlizing a gaseous circulation medium wherein said formation fluids are utilized to form a foam within the well bore, which foam is swept from the well bore with said gaseous circulating medium so as to carry with it any of said cuttings, the improvement which comprises injecting into said well a foaming agent comprising an alkali metal 3-hydroxy ($C_{12}$–$C_{14}$) alkyl sulfonate.

4 Claims, No Drawings

METHOD OF REMOVING LIQUIDS AND SMALL SOLIDS FROM WELL BORES

This invention relates to a method for removing liquids, small solids, chips and the like from well bores during drilling and well cleaning operations. More particularly, the invention relates to the use of certain hydroxy alkyl sulfonates as foaming agents in the gas drilling of wells and in well clean-out operations.

The use of foams as circulation fluids in the gas drilling of wells or in well cleaning operations to remove liquids and small solids from the well bores is known in the art. In general, a foaming agent may be injected along with the gas into the well whereupon contact with the fluids in the well results in generation of a foam in situ. Alternatively, some systems involve the generation of the foam at the wellhead followed by circulation of the foam into the well bore. This latter techinque has the advantage of better control over the quality of the foam produced. However, in either situation a primary consideration is the ability of the foaming agent to form and maintain an adequate foam under the subterranean conditions of the well and effectively to remove liquids and small solids from the well bores.

A number of foaming agents have been suggested in the art. For example, the use of water-soluble alkylbenzene sulfonates is suggested in U.S. Pat. No. 3,269,468 while the use of water-soluble sulfated ethoxylates of normal primary alkanols is suggested in Canadian Pat. No. 787,835. In addition, a foamable composition for use as a well circulation fluid comprising a detergent range olefin sulfonate in combination with a primary alcohol is disclosed in British Pat. No. 1,243,559. A variety of foaming agents are disclosed in U.S. Pat. No. 3,313,362 for use in combination with water, clays and gums to provide an additive composition for injection along with a gaseous drilling fluid.

As indicated above, a primary consideration of the foaming agent is its ability to produce and maintain a large quantity of foam under well conditions which involve briny water, the presence of lime and the presence of oil, as this is indicative of the effectiveness of the foaming agent to remove liquids and small solids from the well bores. For this reason it is desirable to find new foaming agents which have improved foaming characteristics under well conditions.

In accordance with this invention, it has been found that certain hydroxy alkyl sulfonates possess unusually superior foaming characteristics under well conditions as compared to a number of foaming agents heretofore used in the prior art. The specific foaming agents used in the method of this invention are the alkali metal 3-hydroxy-($C_{12}$–$C_{14}$) alkyl sulfonates. These sulfonates are known in the art as generally indicated in U.S. Pat. No. 3,488,384 and U.S. Pat. No. 3,496,225 and may be prepared by first forming the gamma-sultones by low $SO_3$ mol ratio sulfonation of $C_{12}$–$C_{14}$ alpha-olefins and then treating the thus formed gamma-sultones with dilute aqueous sodium hydroxide at elevated temperatures of the order of 200°C. It is also pointed out that in preparing these 3-hydroxy-($C_{12}$–$C_{14}$) alkyl sulfonates there may also be formed the corresponding $C_{12}$–$C_{14}$ alkene sulfonates and disulfonates. Normally, the presence of these materials does not cause undue adverse effects when present in minor amounts and therefore need not be completely separated from the desired materials before use.

The sulfonates may be generally any of the alkali metal salts such as lithium, sodium, potassium, and the like. The alkali metals preferred are sodium and potassium.

A series of dynamic foam comparative evaluation tests were run on several foaming agents including those used in the method of this invention. The apparatus employed for testing the foaming agents was designed to simulate the conditions in the bore hole of a well. A cylindrical glass column about 60 inches in height and about four inches in inside diameter was used to simulate the well bore. A 2-inch I.D. tube was concentrically positioned within this glass column extending from the top nearly to the bottom thereof to represent a hollow drill string for conveying air to the bottom of the simulated well bore. A downwardly inclined side arm was provided near the top of the column to facilitate the discharge of foam from the column. A T-connection was located at the top of the internal tube to permit air and makeup liquid to be introduced through the tube to the bottom of the column. A pressure gauge was provided in the air inlet to the internal tube for measurement of the air pressures applied during foam generation.

In conducting the tests, two liters of a test solution were initially placed in the outer column which reached a level in the column about three feet from the side arm near the top of the column. This test solution was typical of the fluid mixture that would be found in a well bore and comprised saturated lime water containing 5 percent NaCl and 1 percent crude oil. The air pressure on the head of liquid in the column was adjusted to 3 psi at the beginning of each test. The tests were commenced by adding a quantity of the foaming agent to the test solution and then introducing air through the inner tube and into the test solution through radial holes formed in the bottom end of the tube. The temperature of the system was maintained at about 75°F. Each test was conducted over an interval of about 5 minutes and any foam discharged through the side arm was collected, deflated with an isopropanol alcohol spray and measured. The results of these comparative tests are indicated in Table I.

TABLE I

| Experiment No. | Foaming Agent | Agent Conc. (wt%) | Liquid Carry-over (ml) |
|---|---|---|---|
| 1 | Ammonium $C_{10}$–$C_{14}$ alkyl ethoxylated sulfate (40% EtO) | 0.165 | 170 |
| 2 | Ammonium $C_{10}$–$C_{14}$ alkyl ethoxylate sulfate (40% EtO) | 0.33 | 275 |
| 3 | Sodium $C_{14}$ alkene sulfonate | 0.33 | Note A |
| 4 | Sodium $C_{14}$ alkene sulfonate | 0.33 | 220 |
| 5 | Sodium $C_{14}$ alkene sulfonate | 0.33 | 170 |
| 6 | Sodium $C_{14}$–$C_{16}$ alkene sulfonate | 0.33 | Note B |
| 7 | Sodium $C_{14}$–$C_{16}$ alkene sulfonate | 0.33 | 120 |
| 8 | Sodium $C_{14}$–$C_{16}$ alkene sulfonate | 0.33 | 125 |
| 9 | Sodium $C_{16}$ alkene sulfonate | 0.33 | 155 |
| 10 | Sodium $C_{16}$ alkene sulfonate | 0.33 | Note C |
| 11 | Sodium $C_{10}$–$C_{12}$ alkylbenzene sulfonate | 0.33 | Note D |
| 12 | Sodium 2-hydroxy-3-octyloxy-propyl sulfonate | 0.33 | Note E |
| 13 | Sodium 2-hydroxy-3-decyloxy-propyl sulfonate | 0.33 | Note F |
| 14 | Sodium 4-hydroxy-tetradecyl sulfonate | 0.165 | 80 |
| 15 | Sodium 4-hydroxy-tetradecyl sulfonate | 0.28 | 80 |
| 16 | Sodium 3-hydroxy-hexadecyl sulfonate | 0.33 | Note G |
| 17 | Sodium 3-hydroxy-tetradecyl sulfonate | 0.165 | 250 |
| 18 | Sodium 3-hydroxy-tetradecyl sulfonate | 0.33 | Note H |

Notes:
A — Foam rose only 24 inches in column.
B — Foam rose only 30 inches in column.
C — Foam rose only 4 inches in column.
D — No foam E — Foam rose only 10 inches in column.
F — No foam
G — No foam
H — Excessive foam overflowed 250 ml receiver resulting in substantial unaccounted loss.

In the above tests, the foaming agent used in experiments 1 and 2 was commercially obtained; in experiment 3 the foaming agent was 88% monosulfonate, 11% disulfonate and 6% hydroxysulfonate; in experiment 4 the foaming agent was about 66% monosulfonate, about 3% disulfonate and about 31% hydroxysulfonate; in experiment 5 the foaming agent was about 56% monosulfonate, about 13% disulfonate and about 31% hydroxysulfonate; in experiment 6 the foaming agent was about 71% monosulfonate, about 1% disulfonate and about 28% hydroxysulfonate; in experiment 7 the foaming agent was about 58% monosulfonate, about 10% disulfonate and about 32% hydroxysulfonate; in experiment 8 the foaming agent was about 42% monosulfonate, about 23% disulfonate and about 35% hydroxysulfonate; in experiment 9 the foaming agent was about 63% monosulfonate, about 3% disulfonate and about 34% hydroxysulfonate; in experiment 10 the foaming agent was about 95% monosulfonate and about 5% disulfonate; in experiment 11 the foaming agent was commercially obtained; in experiments 14 and 15 the foaming agent was about 77% hydroxysulfonate and about 23% $C_{14}$ alkene monosulfonate; in experiment 16 the foaming agent was about 83% hydroxysulfonate (93% 3-hydroxy) and about 17% $C_{16}$ alkene monosulfonate; in experiments 17 and 18 the foaming agent was about 88% hydroxysulfonate (90% 3-hydroxy) and about 12% $C_{14}$ alkene monosulfonate.

In general, the foaming agents in experiments 4–9 were prepared by merely sulfonating the corresponding alpha-olefin with $SO_3$ followed by neutralization with aqueous sodium hydroxide; in experiments 16, 17 and 18 the preparation involved sulfonating the corresponding alpha-olefin with $SO_3$ followed by extraction of the gamma-sultone fraction using methanol and then hydrolyzing and neutralizing with aqueous sodium hydroxide; in experiments 3 and 10 the preparation involved the remaining fractions from the preceding preparations (16–18) which were first extracted with hexane to remove delta sultones and then neutralized with aqueous sodium hydroxide; in experiments 14 and 15 the preparation involved the delta sultone separated in the preceding preparations (3–10) which was hydrolyzed and neutralized with aqueous sodium hydroxide; in experiments 12 and 13 the preparations involved the reaction of the alkanol with epichlorohydrin followed by reaction with $NaHSO_3$.

The above data indicate the superiority of the 3-hydroxy $C_{14}$ alkyl sulfonate derivative (experiments 17 and 18) with regard to foaming characteristics as compared to otehr foaming agents including some closely related homologs. Similar superior foaming characteristics may be obtained with the coresponding 3-hydroxy $C_{12}$ and $C_{13}$ derivatives.

The concentrations and manner of adding the foaming agents to the formation fluids is subject to considerable variation. Foaming agent concentrations and water-foam injection rates will depend upon lithology, well depth, formation water influx rate and penetration rate. Generally, if the formation waterflow is sufficient to disperse the cuttings, the foaming agent may be advantageously continuously injected with only enough water added to carry the foam to the bit. Conversely, if there is insufficient formation water to disperse the cuttings, more water is added at the surface along with the foam. While it is normal to employ 2–4 gallons of foaming agent in about 10 barrels of water to produce a suitable foam, concentrations considerably lower than this may be expected with the foaming agents used in the method of this invention due to their improved foaming efficiency.

In general, foaming agent and water additions should be the smallest quantities which will produce constant circulation and low even circulation pressure in order to achieve maximum penetration while maintaining chemical costs at a minimum. With the foaming agents used in the invention, concentration as low as 0.01 weight percent to as high as about 10 weight percent may be employed. In most instances, an amount of from about 0.01 weight percent to about 5 weight percent will provide a suitable foam in the well bore annulus with about 0.2 weight percent being suitable for the most frequently encountered conditions of moderate brine and clay cuttings contamination of formation waters.

Large quantities of fluid are sometimes more economically handled by intermittently slugging the input air or gas with a few barrels of water containing a higher concentration of foaming agent. This causes a pressure surge in the well which blows out a large quantity of water and may permit a lower average pressure to be maintained. When producing a foam during air drilling, the exact amount of water or fluid to be removed usually is not known accurately. Deficiency of mixing is also unknown. Because of these two unknown factors, it normally is advisable to employ an excess concentration as this causes only a slight decrease in foaming effectiveness in most instances. Moreover, a slight excess of the foaming agent over that which is required to produce the necessary amount of foam, initially, is generally desirable since the concentration of the foaming agent is constantly decreasing as the foam is lifted from the bore of the well.

Another factor which will influence the amount of foaming agent which should be added to the air stream or injected into the formation water is the air flow rate being employed. It has previously been indicated in the art that high air flow rates tend to break the foams with the appearance of voids and channels.

In addition to the use of foaming agents for removing inflowing formation liquids from the borehole of the well being drilled, they may also be employed in drilling lost circulation zones, drilling seismic shockhole and percussion drilling. The agents are also useful in unloading water from producing gas wells and in removing water after fracturing, acidizing and other completion operations. The agent are suitable for use in both fresh water and brine conditions. Where hydraulic fracturing with water is contemplated, the foaming agent may be introduced to the fracturing liquid following completion of the fracture. Use of the foaming agents as the further advantage of washing away paraffin deposits, sludge and mud cake. In some instances, the foaming agents may therefore actually increase the hole diameter through the productive zone. Additionally, foaming agents may be utilized in coring low pressure pay zones.

Thus, having described the invention in detail, it will be understood by those skilled in the art that certain variations and modifications may be made without departing from the spirit and scope of the invention as described herein and in the appended claims.

I claim:

1. In the method of removing cuttings and formation fluids from the bore of a well utilizing a gaseous circulation medium wherein said formation fluids are utilized to form a foam within the well bore, which foam is swept from the well bore with said gaseous circulating medium so as to carry with it any of said cuttings, the improvement which comprises injecting into said well a foaming agent comprising an alkali metal 3-hydroxy $C_{12}$–$C_{14}$ alkyl sulfonate.

2. The improvement of claim 1 wherein the foaming agent comprises a mixture of the sulfonates.

3. The improvement of claim 1 wherein the alkali metal is sodium or potassium.

4. The improvement of claim 3 wherein the sulfonate is sodium 3-hydroxy $C_{14}$ alkyl sulfonate.

* * * * *